US011896976B2

(12) United States Patent
Blumentritt et al.

(10) Patent No.: US 11,896,976 B2
(45) Date of Patent: Feb. 13, 2024

(54) LIDDED VESSEL ASSEMBLY FOR LABORATORY USE

(71) Applicant: Eppendorf AG, Hamburg (DE)

(72) Inventors: Michael Blumentritt, Hamburg (DE); Kai Holl, Hamburg (DE)

(73) Assignee: Eppendorf AG, Hamburg (DE)

( * ) Notice: Subject to any disclaimer, the term of this patent is extended or adjusted under 35 U.S.C. 154(b) by 466 days.

(21) Appl. No.: 16/978,411

(22) PCT Filed: Mar. 5, 2019

(86) PCT No.: PCT/EP2019/055410
§ 371 (c)(1),
(2) Date: Sep. 4, 2020

(87) PCT Pub. No.: WO2019/170651
PCT Pub. Date: Sep. 12, 2019

(65) Prior Publication Data

US 2021/0039090 A1 Feb. 11, 2021

(30) Foreign Application Priority Data

Mar. 7, 2018 (EP) .................................... 18160393

(51) Int. Cl.
*B01L 3/00* (2006.01)

(52) U.S. Cl.
CPC ... *B01L 3/50825* (2013.01); *B01L 2200/0689* (2013.01); *B01L 2300/042* (2013.01); *B01L 2300/043* (2013.01)

(58) Field of Classification Search
CPC ......... B01L 3/50825; B01L 2200/0689; B01L 2300/042; B01L 2300/043; B01L 2200/0684; B01L 2300/048
See application file for complete search history.

(56) References Cited

U.S. PATENT DOCUMENTS 3,164,279 A 1/1965 Towns
3,834,571 A 9/1974 Bartell
(Continued)

FOREIGN PATENT DOCUMENTS

CN 102046487 A 5/2011
CN 102639246 A 8/2012
(Continued)

OTHER PUBLICATIONS

PCT/EP2019/055410: International Filing Date Mar. 5, 2019; International Preliminary Report on Patentability dated Sep. 17, 2020 (11 pages).

(Continued)

*Primary Examiner* — Benjamin R Whatley
*Assistant Examiner* — Peter Valentin Diaz
(74) *Attorney, Agent, or Firm* — Barclay Damon LLP

(57) ABSTRACT

A lidded vessel assembly comprises a tubular vessel, a lid, and a latching device. The tubular vessel defines a vessel opening and comprises a vessel base, an inner wall, a sealing area and a parking area both defined on the inner wall and both positioned below the vessel opening. The lid comprises a lid base having an inside surface, and a plug projecting from the inside surface of the lid base. The plug is configured to be inserted through the vessel opening to engage the parking area to define a parking position, and configured to be further inserted through the vessel opening out of the parking area to bias against a portion of the sealing area to define a sealing position. The first latching device comprises a first latching element positioned on the inner wall of the vessel, and a second latching element positioned on the outside of the plug.

20 Claims, 16 Drawing Sheets

(56) References Cited

U.S. PATENT DOCUMENTS

| | | | | |
|---|---|---|---|---|
| 3,881,626 | A | 5/1975 | Bartell | |
| 4,883,641 | A | 11/1989 | Wicks et al. | |
| 5,354,539 | A | 10/1994 | Hovatter | |
| 2012/0328490 | A1 * | 12/2012 | Loehn | B01L 3/50825 422/550 |
| 2014/0256058 | A1 * | 9/2014 | Dobrowolski | B01L 3/50825 422/550 |
| 2023/0075210 | A1 * | 3/2023 | Chen | B65D 47/18 |
| 2023/0130689 | A1 * | 4/2023 | Cable, Jr. | B01L 3/50825 422/547 |
| 2023/0135183 | A1 * | 5/2023 | Porath | B01L 3/502 422/513 |

FOREIGN PATENT DOCUMENTS

| | | | | |
|---|---|---|---|---|
| CN | 103347613 | A | 9/2013 | |
| CN | 103946121 | A | 7/2014 | |
| EP | 2517791 | A1 | 10/2012 | |
| EP | 2965816 | A1 * | 1/2016 | B01L 3/50825 |
| EP | 2965816 | A1 | 1/2016 | |
| JP | 2014-507256 | A | 3/2014 | |
| WO | 95/20527 | A1 | 8/1995 | |
| WO | 2012083995 | A1 | 6/2012 | |
| WO | 2011/108134 | A1 | 6/2013 | |
| WO | 2015035949 | A1 | 3/2015 | |

OTHER PUBLICATIONS

CN 201980017134.5; Notification of the First Office Action dated Jan. 28, 2022 (9 pages).

CN 201980017134.5; English Translation of Notification of the First Office Action dated Jan. 28, 2022 (9 pages).

PCT/EP2019/055410; International Filing Date Mar. 5, 2019; International Search Report dated Aug. 9, 2019 (6 pages).

PCT/EP2019/055410; International Filing Date Mar. 5, 2019; English Translation of the International Search Report dated Aug. 9, 2019 (4 pages).

JP 2020-546135; Filing Date Mar. 5, 2019; Office Action dated Feb. 20, 2023 (6 pages).

JP 2020-546135; Filing Date Mar. 5, 2019; English translation of Office Action dated Feb. 20, 2023 (7 pages).

* cited by examiner (a)
(b)
(c)
(e)
(F)
12
1.1
2
29
16
c (a)
(b)
(c)
(e)
(f)
c
12
14
16
21
1.3
2

(a)
(b)
(c)
(e)
(F)
12
1.3
2
29
16
c

LIDDED VESSEL ASSEMBLY FOR LABORATORY USE

CROSS REFERENCE TO RELATED INVENTION

This application is a national stage application pursuant to 35 U.S.C. § 371 of International Application No. PCT/EP2019/055410, filed on Mar. 5, 2019, which claims priority to, and benefit of, European Patent Application No. 18 160 393.7, filed Mar. 7, 2018, the entire contents of which are hereby incorporated by reference.

TECHNICAL FIELD

The invention pertains to a lidded vessel assembly made of plastic for laboratory use. Such lidded vessels are also referred to as "reaction vessel" or "reaction vessel with lid".

BACKGROUND

Common lidded vessels made of plastic for laboratory use have a tubular vessel which comprises a vessel base at the bottom, a vessel opening at the top and a sealing area on the inner wall below the vessel opening. A lid comprising a lid base and a plug projecting from the inside of the lid base can be inserted through the vessel opening into a sealing position in which the plug seals at the sealing area. The lid is held in the vessel by the clamping force of the plug. For applications in which an increased vapor pressure above the sample liquid in the vessel can occur, a correspondingly high clamping force of the plug is required. The user must apply a correspondingly high force to close and open the vessel.

Furthermore, lidded vessels are known in which the lid is connected to the vessel by a hinge. Such lidded vessels with lids which are hinged and open and close are also known as "snap-lid vessels". Furthermore, lidded vessels made of plastic are known to have a special catch between the lid and the vessel in order to hold the lid in the sealing position on the vessel.

EP 2 654 958 B1 describes a lidded vessel which, for easy and safe closing and easy opening, comprises a latching projection at the upper brim of the vessel and an elastic tab protruding from the underside of the base of the lid with a latching edge which can be snapped under the latching projection, as well as a button protruding laterally outwards from the tab for releasing the locking of the latching edge with the latching projection. According to EP 2 965 816 A1, a first lever protrudes laterally outwards from the tab and a second lever protrudes upwards from the first lever at a distance from the tab in order to release the latching mechanism simply by pressing against the second lever.

Conventional lidded vessels are delivered in an open position, several in a bag, protected from contamination. They are not delivered in a closed state because this would relax the sealing geometry, so that the vessels no longer seal during use. As a consequence, contamination can occur, especially after removing the vessels from the bag. Another disadvantage is that the vessels must first be closed for labelling the lid, then opened again for filling with sample liquid and closed again afterwards.

U.S. Pat. No. 3,881,626 A describes a lidded vessel for lyophilized products. A lid with a plug containing aeration means is inserted into the neck of a tubular vessel. In an aeration position, the lid with the plug is only partially inserted into the vessel mouth, so that the aeration agent aerates the inside of the vessel. In a sealing position, the lid is pushed into the neck until it rests against the brim of the mouth, so that the plug seals in the neck and a rib projecting inwards on a skirt of the lid is snapped into place with a bead on the outside of the neck. The aeration position is used for aeration during lyophilization. In the aeration position, the lidded vessel must stand upright, as the lid is loosely inserted into the vessel.

U.S. Pat. No. 3,164,279 A describes a test tube with a tube and a lid. The lid can be moved to a ventilation position and to a deeper sealing position by means of a plug. For this purpose, the plug on the jacket comprises an only partially circumferential, interrupted bead and further up an uninterrupted bead. If the plug is only inserted into the mouth of the vessel with the interrupted bead, air can enter or leave the vessel through the interruption in the bead. When the plug is inserted deeper, the continuous bead seals against the inner wall of the vessel. The disadvantage is that it is difficult for the user to control when the aeration position and the sealing position are reached. In addition, the lid can easily be moved out of the respective position. In addition, the sealing area is stressed in the aeration position and can relax.

EP 2 517 791 A1 describes a lidded vessel in which either a plug of the lid further down comprises an interrupted sealing area or the vessel further up comprises an axial venting groove. As a result, the interior of the vessel is vented when the plug is only partially inserted. Only when the plug is fully pushed in until the lid rests against the mouth of the vessel is a seal achieved. Also, with this lidded vessel the aeration position is not unambiguous and the lid can easily be moved from the respective position.

WO 2011/108134 A1 describes a lidded vessel in which the plug-like lid is connected to the vessel by means of a tab and comprises a Snap-On connection at the outer edge with a pin projecting outward from the vessel and a clip projecting downwards from the lid. From the closed first position, in which the plug is positioned concentrically in the vessel, the lid can be pivoted by pushing up the tab into a second position, in which the plug is partially inserted into the vessel and the snap connection is still in place. This is to prevent liquid from splashing as a result of the impulse when the lid is released. By subsequently pressing on the edge of the lid next to the connecting tab, the snap connection can be released and the lid can be swiveled into a third position directed vertically to the opening, in which it is connected to the vessel via another snap connection. To close the lid, it can immediately be pushed from the third to the first position. The lidded vessel is structurally complex and difficult to operate.

U.S. Pat. No. 5,354,539 describes a lidded vessel in which the lid is flexibly connected to the vessel. The lid comprises a plug with which the lid can be pressed into a sealing position in the vessel. From the sealing position the lid can be swiveled into a locked position in which the plug also seals in the vessel. Sealing and locking the lid requires different movements, which makes handling more difficult.

BRIEF SUMMARY OF THE INVENTION

The underlying object of the invention is to create a lidded vessel assembly ("lidded vessel") which is better protected from contamination and easier to handle.

The lidded vessel made of plastic for laboratory use according to the invention comprises a tubular vessel or tubular receptacle or container comprising a vessel base at the bottom, a vessel opening at the top, and a sealing area on the inner wall below the vessel opening. The lidded vessel further includes a lid comprising a lid base and a plug which projects from the inside of the lid base and which can be inserted through the vessel opening into a sealing position in which the plug bears in a sealing manner against the sealing area. The plug engages in the vessel opening in a parking position and does not engage in the sealing area or engages in the sealing area with a different section than in the sealing position. The lidded vessel further includes a first latching device with a first latching element on the inner wall of the vessel and a second latching element on the outside of the plug is provided for releasably latching the lid to the vessel in the parking position.

In an embodiment of the lidded vessel, the lid can be brought into a parking position in which the lid substantially or completely closes the vessel. In the parking position, the lid is held in place by the first latching device of the lidded vessel. This prevents relaxation of the plastic due to tension between the sealing area and the plug, which would make it impossible to seal the plug in the sealing area in the sealing position. This ensures that the lidded vessel can later be closed in a sealing manner. For this purpose, the lid is brought into the sealing position, in which the plug lies sealingly against the sealing area. The stresses between the sealing area and the plug are high enough to seal the lidded vessel.

In order to avoid relaxation in the parking position, which no longer permits sealing in the sealing position, it is sufficient if in the park position either the sealing area or the section of the plug which engages in the sealing area in the sealing position is not subjected to stresses which cause corresponding relaxation. As a result, the stresses between the sealing area and the plug in the sealing position are high enough to seal the lidded vessel. In accordance with preferred design types, both the sealing area and the section of the plug that engages the sealing area in the sealing position are not subjected to any stresses in the parking position, or only to minor stresses where the plastic relaxes so slightly that sealing still occurs in the sealing position. The first latching device comprises a first latching element on the inner wall of the vessel and a second latching element on the outside of the plug, so that the lid and vessel can be latched together simply by pressing the plug into the vessel opening up to the parking position. The first latching device makes it easier to find the parking position. As a result, the lidded vessel is also particularly suitable for automatic locking of the lid in the parking position. This makes it easier to produce and provide a large number of lidded vessels in parking positions in the bag. The locking in the parking position can be released in a targeted manner with corresponding ease. Latching elements on the outside of the lidded vessel, which make handling difficult, take up space and can be opened easily by applying force from the outside, are no longer required.

A large number of lidded vessels with the lid in parking position can be delivered in a bag. Since the lidded vessels are closed, the risk of contamination is reduced, especially after removal from the bag. In addition, lidded vessels can be labeled on the top of the lid immediately, as they are already closed. The first latching device is located inside the lidded vessel to prevent unintentional opening or further closing of the lid as a result of external forces acting on the bag or during the labelling process. Since tension between plug and vessel in the parking position as well as in the sealing position can be avoided, opening the lid after labelling can be easier than with conventional vessels when filling with sample liquid. If the plug seals in the vessel in the parking position, relaxation of the plastic can make it easier to open the lid after labelling.

According to an embodiment, in the parking position the plug engages a parking area on the inner wall of the vessel, which is located above the sealing area. This allows the parking position to be reached by partially inserting the plug into the vessel. This makes it easier to reach the parking position and to open the vessel. According to another design, the parking area is located on the inner wall of the vessel below the sealing area. To reach the parking position, the lid with the plug must be inserted deeper into the vessel than to reach the sealing position.

According to another embodiment, the plug and the parking area are configured in such a way that in the parking position there is a clearance fit between the plug and the parking area. This means that the dimensions and tolerances of plug and parking area are such that the smallest dimension of the parking area is always larger than or equal to the largest dimension of the plug. This prevents tension between plug and parking area in the parking position. Relaxation of the plug is thus avoided.

According to another embodiment, the plug and parking area are configured in such a way that in the parking position there is an interference fit between plug and parking area. The press fit allows the lid to lie sealingly against the parking area. This reduces the risk of contamination to a particularly high degree. Due to the press fit, the plug can relax in the parking position. However, the plug can still seal in the sealing position in the sealing area, since the sealing area has not relaxed and sufficient tension can build up between the plug and the sealing area for sealing. The interference fit can also be selected so that the stress between plug and parking area in the parking position is less than the stress between plug and sealing area in the sealing position. This keeps relaxation and the plug relatively low.

According to another embodiment, the parking area is located above the sealing area and widens towards the top. This makes it easier to insert the plug into the parking area. According to a preferred design, the parking area is conical.

According to another embodiment, the sealing area is a cylindrical or conical area on the inner wall of the vessel against which the plug rests in the sealing position. According to another embodiment, the sealing area is concentric to the center axis of the vessel, i.e. the center axis of the sealing area coincides with the center axis of the vessel. According to another embodiment, the diameter of the conical area widens towards the top or bottom.

According to another embodiment, the first latching device comprises a radially inwardly projecting first latching projection on the inner wall of the vessel. In this embodiment with a lid connected to the vessel by a hinge, a rim at the lower end of the plug can be locked behind the first latching projection by swiveling the lid closed. In another embodiment, the first latching projection runs around at least part of the circumference of the inner wall of the vessel. In another embodiment, the first latching projection is located above the parking area.

In another embodiment, the first latching device comprises a second latching projection projecting radially outwards on the outside of the plug. The plug can be latched with the second latching projection behind the first latching projection. This ensures that the lid is even better secured in the parking position. According to an embodiment, the second latching projection at least partially circumscribes the plug. With this embodiment, the lid can be connected to the vessel via a hinge or it can be a removable lid that is completely detachable from the vessel.

In another embodiment, the first latching device comprises a groove or crease running at least partially around the inner wall of the vessel and/or a bead running at least partially around the outside of the plug. In the parking position, the plug engages with the bead in the groove or crease. The groove has the function of a parking area. The upper flank of the groove has the function of the first latching projection. The bead has the function of the second latching projection. The lower flank of the groove can prevent the plug from inadvertently entering the sealing area. Preferably, the outer diameter of the bead is larger than the inner diameter of the vessel directly next to the groove or crease. Preferably the outer diameter of the bead is smaller or equal to the inner diameter of the groove or crease. The term “groove” in this application refers to an elongated depression and “crease” to a narrow-elongated depression. The term “groove” can also be used collectively.

In another embodiment, the first latching device comprises a groove or crease running at least partially around the inner wall of the vessel and a radially outwardly projecting second latching projection on the outside of the plug or a rim at the lower end of the plug. In this embodiment, the plug is locked in the groove or crease by the second latching projection or the edge at the lower end of the plug.

In another embodiment, the first latching device on the inner wall of the housing comprises a radially inwardly projecting first latching projection and the outside of the plug comprises an at least partially circumferential bead. In this embodiment, the bead is locked behind the first latching projection. In another embodiment, the first latching projection or the groove or crease completely encircles the circumference of the inner wall of the vessel.

In an embodiment, the first latching projection or the groove or crease located on the inside wall of the vessel on the side opposite the hinge and does not completely encircle the circumference of the inside wall of the vessel. According to an embodiment, the first latching projection or groove or crease runs around the inner wall of the vessel over an angle of maximum 180°, preferably maximum 90°, preferably maximum 45°, preferably maximum 22.5°, preferably maximum 11.25°. In an embodiment, the first latching projection or groove or crease on the side opposite the hinge extends symmetrically on both sides of a vertical plane through the hinge and the central axis of the vessel.

In an embodiment, the bead completely encircles the outside of the plug and the plug with the bead in the sealing position is in contact with the sealing area. In this embodiment, the bead also has the function of a sealing element. In the sealing position, the bead rests on the sealing area in a narrow, preferably linear, circumferential area, so that there is a high surface pressure there, which effects a seal.

According to an embodiment, a second latching device is provided for releasably latching the lid to the vessel in the sealing position. The second latching device holds the lid in the sealing position on the vessel, so that in the sealing position only the tension required for sealing must act between the plug and the sealing area. This reduces the forces to be applied by the user for closing and opening the lidded vessel.

According to another embodiment, the second latching device comprises at least one third latching projection projecting radially outwards at the upper brim of the vessel and at least one elastic tab projecting from the underside of the lid base with a latching edge at a distance from the lid base, which can be snapped under the latching projection when the plug is inserted into the sealing area. This embodiment provides a particularly secure locking of the lid on the vessel, which can be produced and released again with low forces. In this respect, reference is made to the locking means of the lidded vessel according to EP 2 654 958 B1, the contents of which are hereby included in this application.

In an embodiment, a first lug protrudes outwards from the flap at a distance from the bottom of the lid. The first lever makes it easier to release the latching of the lid with the vessel. It corresponds to the tab of EP 2 654 958 B1.

According to another embodiment, a second lever projects upwards from the first lever at a distance from the tab. The second lever makes it easier to release the latching of the lid with the vessel. In this respect, reference is made to the second lever of the lidded vessel according to EP 2 965 816 A1, the contents of which are hereby incorporated in this application.

According to another embodiment, the second lever is provided with a rib protruding outward. The rib can be used to open and close the lid by means of a working cone of a dosing device or another tool. In an embodiment, the rib is arranged on the second lever in such a way that it extends in horizontal direction with the lid in sealing position and vertically aligned central axis of the vessel. Preferably, a working cone is used for opening and closing the lid, which comprises a circumferential groove on the outer circumference. The working cone is preferably pushed onto the rib from the side with the circumferential groove in order to unlock and open the lid by moving the working cone towards the vessel and upwards or to close it by moving the working cone downwards. The working cone of an automatic dosing machine, an automatic laboratory machine or a manual pipette can be used for this purpose. The vessel is preferably held in a holder.

According to another embodiment, the lid and vessel are connected by a hinge. The hinge facilitates the opening and closing of the lid. In an embodiment, the hinge is a band hinge. A band hinge is particularly advantageous for the one-piece production of the lidded vessel by injection molding. According to another embodiment, the hinge is a butterfly hinge. The butterfly hinge comprises two parallel and spaced-apart hinge straps, each of which is connected to the outer edge of a first pocket in the upper brim of the vessel and to the outer edge of a second pocket on the lower brim of the lid base, the hinge straps being so short that when the lid is closed and its underside rests on the upper brim of the vessel, they are pulled taut and are at least partially accommodated by the first and second pockets. When the vessel is closed, the butterfly hinge does not protrude outwards, so that the vessel requires only a small amount of space. As a result, several vessels can be stored next to each other to save space. A further advantage is that the butterfly hinge connects the lid and vessel in such a way that the lid does not open on the hinge side when the internal pressure is increased. This prevents the first latching device from accidentally coming loose.

According to another embodiment of the lidded vessel with hinge, the lid with the plug is in parking position at an acute angle to the central axis of the vessel and in sealing position concentric to the central axis of the vessel. Accordingly, the parking area of the vessel is at an acute angle to the central axis of the vessel and the sealing area is concentric to the central axis of the vessel. In this embodiment, for example, the parking area is a groove or crease running at least partially around the inner wall of the vessel at an acute angle to the central axis of the vessel and the sealing area is a circular cylindrical or conical area on the inner wall of the vessel concentric to the central axis.

According to a further embodiment, the first latching device and/or the second latching device is/are arranged diametrically opposite the hinge. In this embodiment, the lid is held in the parking position and in the sealing position on diametrically opposite sides by the hinge and the first latching device or the second latching device.

According to another embodiment, the lid can be completely removed from the vessel. Here the lid and vessel are not connected by a hinge. The lid with the plug can be inserted into and removed from the vessel in the axial direction of the vessel. Thus, the plug is concentric to the vessel in the parking position as well as in the sealing position. The parking area is formed, for example, by a groove or crease completely encircling the inner wall of the vessel above the sealing area, into which the plug engages in the parking position with a bead running around its outer circumference. The sealing area is, for example, a cylindrical or conical area on the inner wall of the vessel, against which the bead of the plug rests in the sealing position. The inner diameter of the sealing area is smaller than the outer diameter of the bead at the point where the bead is in contact.

In a lidded vessel where the lid can be removed from the vessel, the lid can be held in the sealing position solely by the clamping force of the plug, or by several second latching devices, for example as described in EP 2 654 958 B1 on the basis of FIGS. 21 to 23.

According to another embodiment, the lidded vessel comprises a nominal volume of at least 0.5 ml, preferably of at least 1.5 ml, preferably of at least 2 ml, preferably of at least 5 ml, preferably of at least 15 ml, preferably of at least 30 ml, preferably of at least 50 ml. According to another embodiment, the lidded vessel comprises one of the following nominal volumes: 0.5 ml, 1.5 ml, 2 ml, 5 ml, 15 ml, 30 ml, 50 ml. The nominal volume is the volume of the sample liquid that the lidded vessel is designed to hold. It is specified by the manufacturer.

According to another embodiment, the lidded vessel is manufactured by injection molding, preferably in one piece. In an embodiment, the lidded vessel is made of polypropylene, polyethylene, a cyclic olefin (CO)polymer or another polyolefin.

An embodiment of a lidded vessel made of plastic for laboratory use comprises a tubular vessel comprising a vessel base at the bottom, a vessel opening at the top, and a sealing area on the inner wall below the vessel opening. The lidded vessel further includes a lid comprising a lid base and a plug protruding from the inside of the lid base, which can be inserted through the vessel opening into a sealing position in which the plug bears sealingly against the sealing area. In a parking position, the lid engages with the plug in the vessel opening without sealing bearing against the sealing area. A first latching device is provided for releasable latching of the lid with the vessel in the parking position.

In an embodiment of the lidded vessel, the plug engages in a parking area on the inner wall of the vessel in the parking position and the plug and parking area are configured in such a way that there is a clearance fit between the plug and parking area in the parking position.

In an embodiment of the lidded vessel, the parking area is located above the sealing area and widens towards the top, whereby the parking area is preferably conical.

In an embodiment of the lidded vessel, the first latching device comprises a radially inwardly projecting first latching projection on the inner wall of the vessel and/or in which the first latching device comprises a radially outwardly projecting second latching projection on the outside of the plug.

In an embodiment of the lidded vessel, a groove or crease at least partially circumscribes the inner wall of the vessel, in which the plug engages in the parking position, and/or a bead at least partially circumscribes the outer side of the plug, which engages with the first latching projection in the parking position.

In an embodiment of the lidded vessel, the bead completely encircles the outside of the plug and in the sealing position lies sealingly against the sealing area.

In an embodiment of the lidded vessel, a second latching device is provided for releasably latching the lid to the vessel in the sealing position.

In an embodiment of the lidded vessel, the second latching device comprises at least a third latching projection projecting radially outwards at the upper brim of the vessel and at least one elastic tab projecting from the underside of the lid base with a latching edge at a distance from the lid base, which can be snapped under the third latching projection when the plug is inserted into the sealing area.

In an embodiment of the lidded vessel, a first lever protrudes laterally outwards from the tab at a distance from the lid base, with a second lever preferably protruding upwards from the first lever at a distance from the tab.

In an embodiment of the lidded vessel, a rib protrudes outwards from the outside of the second lever.

In an embodiment of the lidded vessel, the lid and the vessel are connected to each other by a hinge, preferably a band hinge.

In an embodiment of the lidded vessel, the first latching device and/or the second latching device is/are arranged diametrically opposite the hinge.

In an embodiment, the lidded vessel comprises a nominal volume of at least 0.5 ml, preferably at least 1.5 mL, preferably at least 2 mL, preferably at least 5 ml, preferably at least 15 ml, preferably at least 30 ml, preferably at least 50 ml.

In an embodiment, the lidded vessel is manufactured by injection molding, preferably in a single piece.

In an embodiment, the lidded vessel is comprised of polypropylene, polyethylene, a cyclic olefinic (CO) polymer or other polyolefin.

BRIEF DESCRIPTION OF THE DRAWINGS

The invention is explained in more detail in the following on the basis of the attached drawings of design examples. Shown in the drawings are.

DETAILED DESCRIPTION OF THE INVENTION

Figure 1:
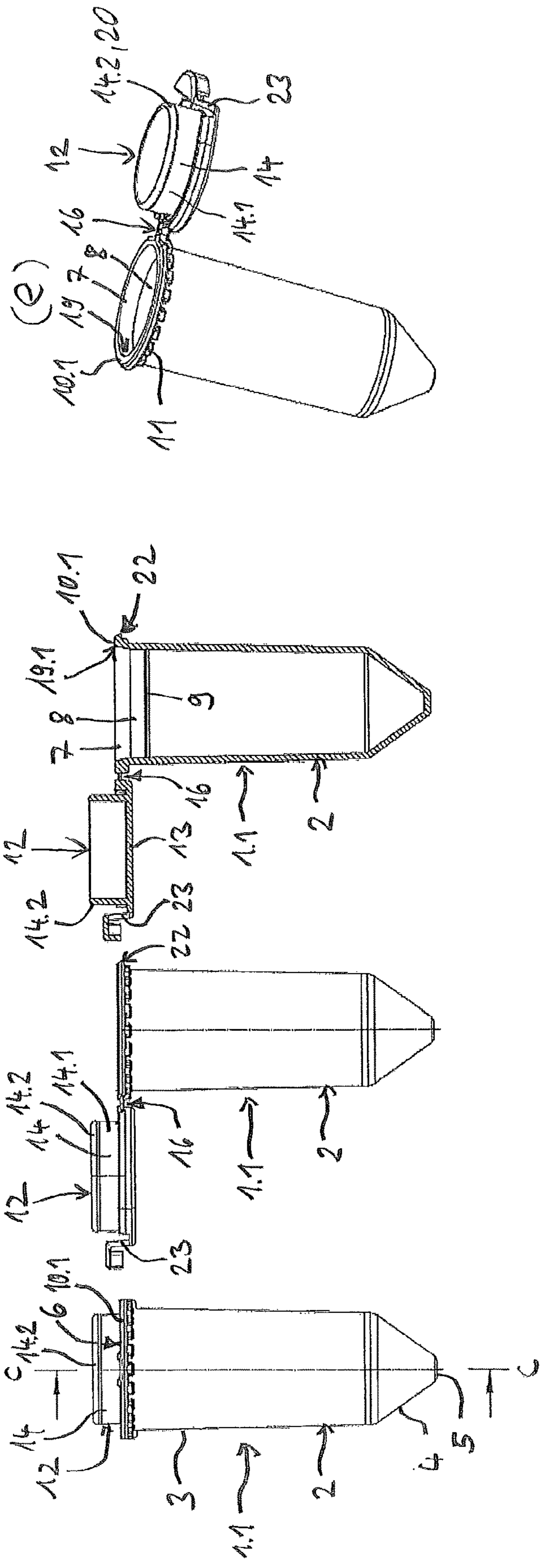
FIG. 1*a* illustrates a front view of an embodiment of a lidded vessel with a hinge, first latching projection, and a lid in the open position.
FIG. 1*b* illustrates a side view of the embodiment of the lidded vessel of FIG. 1*a;*
FIG. 1*c* illustrates a cross sectional view of the embodiment of the lidded vessel of FIG. 1*a* along line c-c.
FIG. 1*d* illustrates a top plan view of the embodiment of the lidded vessel of FIG. 1*a;*
FIG. 1*e* illustrates a side perspective view of the embodiment of the lidded vessel of FIG. 1*a;*

In the present application, the indications 'top' and 'bottom', as well as indications derived therefrom such as 'above' and 'below', refer to the lidded vessel with the lid in the sealing position, the central axis of the tubular vessel being vertically aligned and the vessel base below the lid.

In this application, the terms "latching device", "latching connection" and "latching" are used in the same sense as the terms "Snap-On device", "snap connection" and "snap". These are positive-locking connections in which a protruding part of one connection partner is deflected for a short time and engages in a recess (rear cut) of the other connection partner. The design types comprising a first and a second latching device also allow the connection of the connection partners at several consecutive joining positions.

The lidded vessel 1.1 of FIGS. 1*a*-3*f* comprises a tubular vessel 2 with a circular-round cross-section, which has a hollow cylindrical section 3 at the top and a conical section 4 at the bottom. At the very bottom, vessel 2 has a flat base 5 and at the very top a vessel opening 6. Below the vessel opening 6, the hollow cylindrical section 3 has a conically downward tapering parking area 7, below which there is a downwardly extending sealing area 8 (cf. FIGS. 2*d*, 3*d*). Below the sealing area 8, there is a transition area 9 which tapers conically downwards. Below the transition area 9, the hollow-cylindrical section 3 has an essentially constant wall thickness.

The hollow cylindrical section 3 comprises a slight taper on the outside and inside below the transition area 9 to facilitate removal from an injection mold. At the upper brim the vessel 2 has a circumferential flange 10.1 in the form of a circular ring disk, which projects radially outwards. The flange 10.1 comprises a first bevel 10.2 at the upper brim (see FIGS. 2*d*, 3*d*). The lower edge comprises a sharp edge 10.3.

Below the flange 10.1 there is an optional series of crenellated projections 11 (FIG. 1*e*) on the outer circumference of the vessel 2, which serve for support on the edge of a vessel holder.

The lidded vessel 1.1 has a lid 12, which comprises a lid base 13 and a plug 14 protruding from the lid base 13. The plug 14 has a hollow cylindrical plug section 14.1. At the lower end of the hollow cylindrical plug section 14.1 it has a bead 14.2.

The lid base 13 protrudes laterally beyond the plug 14 everywhere. The lid base 13 has a circular lid rim 13.1, which extends over an angle of approximately 240° (see FIG. 1*d*). This is followed by two lateral, lateral lid rims 13.2, 13.3 and a front, straight lid rim 13.4.

From the circular lid rim 13.1 and from the lateral lid rims 13.2, 13.3 a lid projection 15 protrudes downwards, which serves to support the lid 12 on the upper side of the flange 10.1.

The lid 12 is connected to the vessel 2 by a hinge 16, which is designed as a butterfly hinge with two parallel hinges 16.1, 16.2. The hinge 16 is located in the middle of the circular lid rim 13.1 or opposite the front lid rim 13.4. One end of the hinge bands 16.1, 16.2 (FIG. 1*d*) is connected to flange 10.1 at the outer edge of first pockets 17.1, 17.2 (FIG. 1*d*) and the other end is connected to the circular lid rim 13.1 at the outer edge of second pockets 18.1, 18.2 (FIG. 1*d*).

Figure 1D:
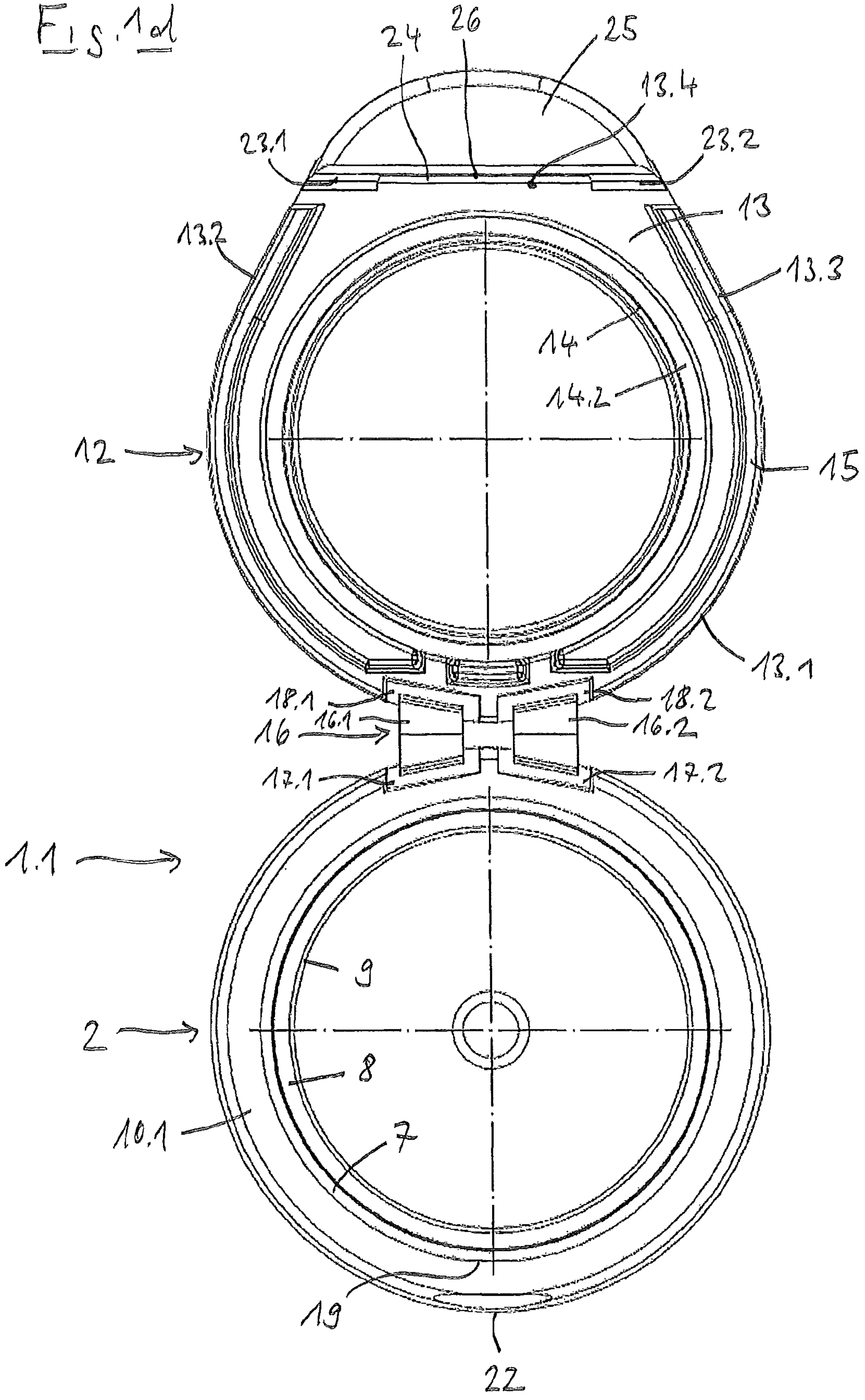
Figure 2:
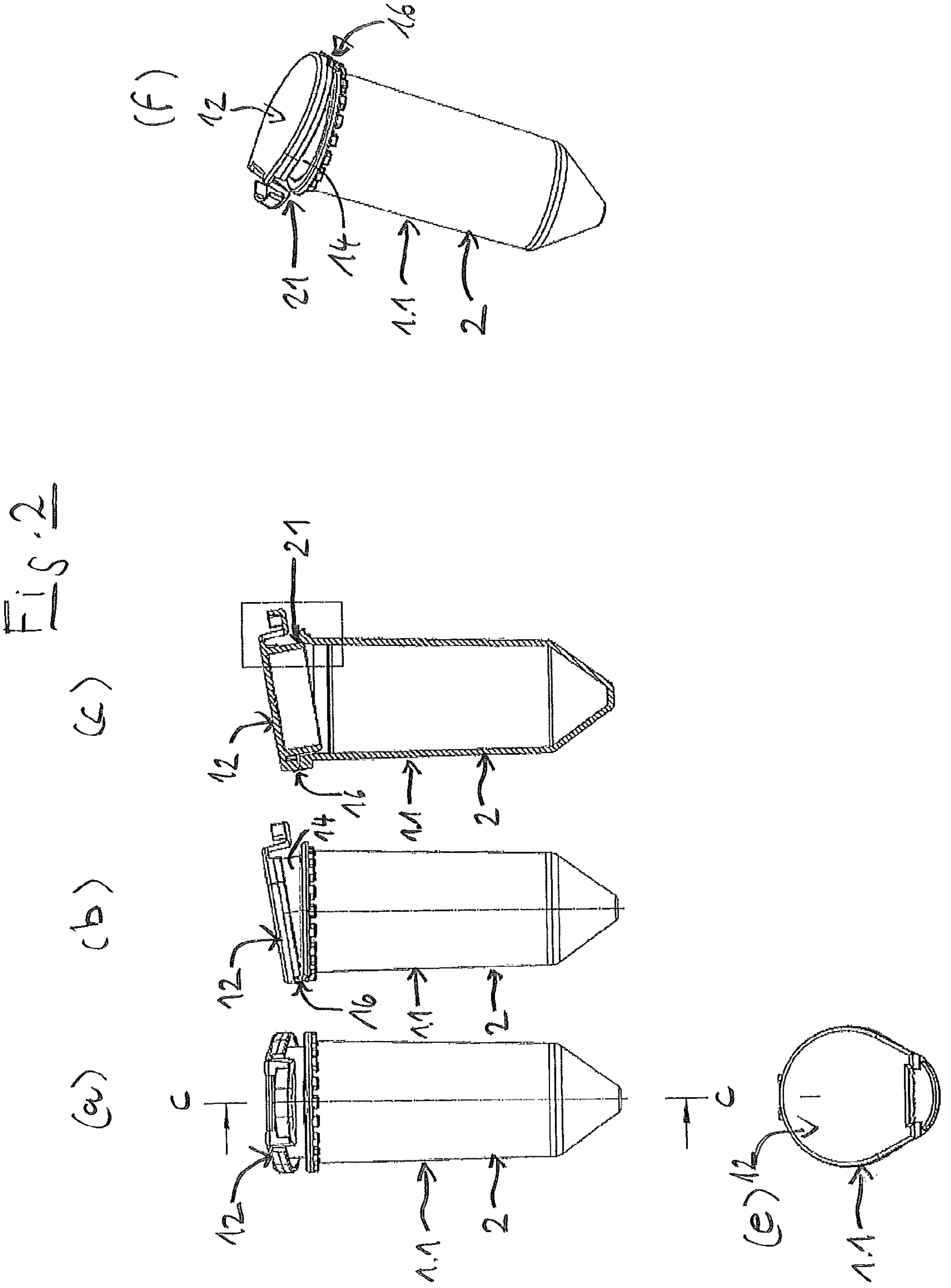
FIG. 2*a* illustrates the embodiment of the lidded vessel of FIG. 1*a* with the lid in parking position.
FIG. 2*b* illustrates a side view of the embodiment of the lidded vessel of FIG. 2*a;*
FIG. 2*c* illustrates a cross sectional view of the embodiment of the lidded vessel of FIG. 2*a* along line c-c.
FIG. 2*d* illustrates an enlarged view of FIG. 2*c;*
FIG. 2*e* illustrates a top plan view of the embodiment of the lidded vessel of FIG. 2*a;*
FIG. 2*f* illustrates a side perspective view of the embodiment of the lidded vessel of FIG. 2*a;*
Figure 2D:
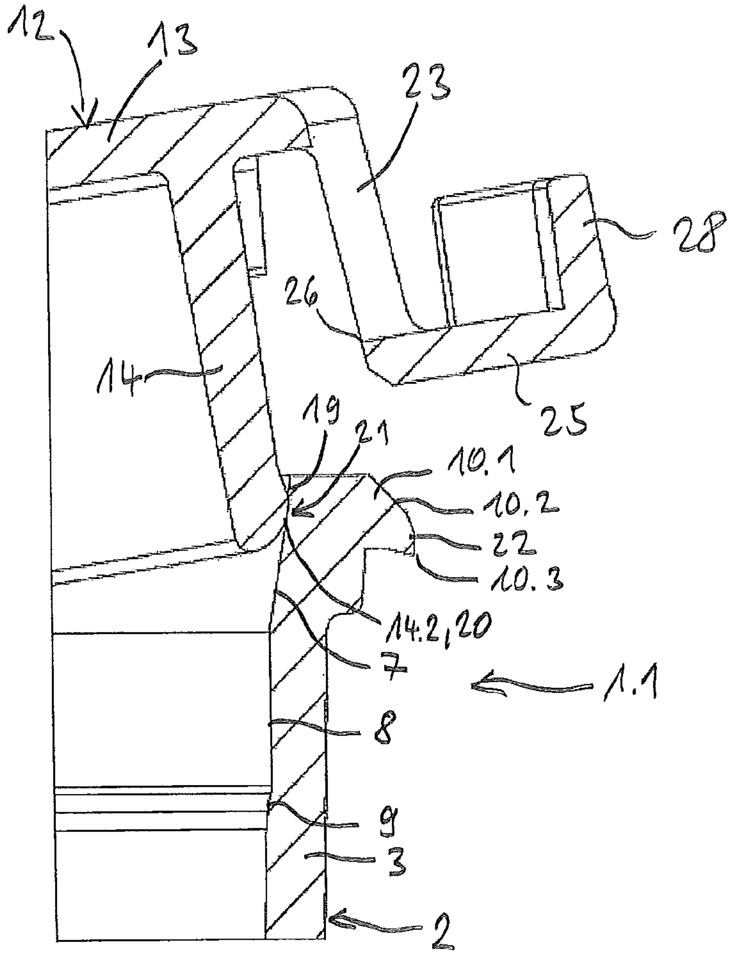
Figure 3:
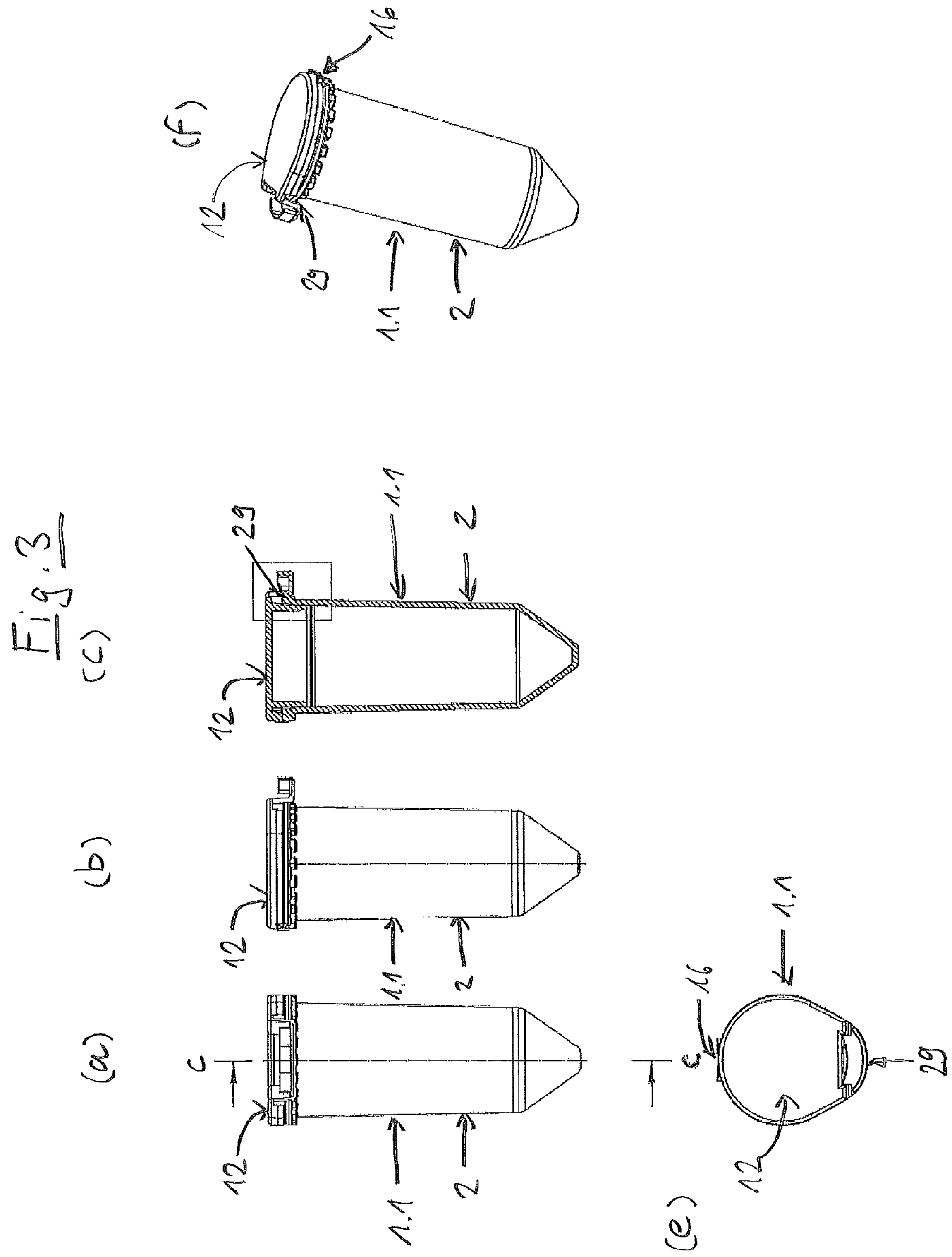
FIG. 3*a* illustrates the embodiment of the lidded vessel of FIG. 1*a* with the lid in sealing position.
FIG. 3*b* illustrates a side view of the embodiment of the lidded vessel of FIG. 3*a;*
FIG. 3*c* illustrates a cross sectional view of the embodiment of the lidded vessel of FIG. 3*a* along line c-c.
FIG. 3*d* is an enlarged view of FIG. 3*c;*
FIG. 3*e* is a top plan view of the embodiment of the lidded vessel of FIG. 3*a;*
FIG. 3*f* illustrates a side perspective view of the embodiment of the lidded vessel of FIG. 3*a;*
Figure 3D:
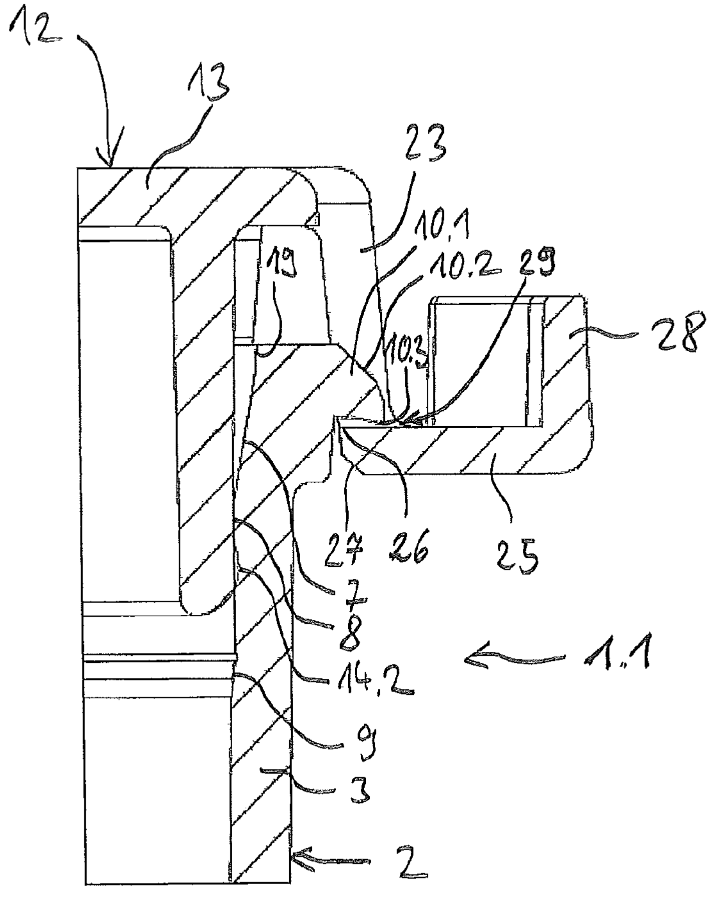

The vessel 2 has a radially inwardly projecting first latching projection 19 at the top of the parking area 7 on the side diametrically opposite hinge 16 (see FIGS. 2*d* and 3*d*). The first latching projection 19 extends in the circumferential direction of the vessel 2 over an angle of approximately 10° (see FIG. 1*d*).

The bead 14.2 is simultaneously a second latching projection 20. The first latching projection 19 and the second latching projection 20 together form a first latching device 21. The peripheral area of the flange 10.1 diametrically opposite hinge 16 is a third latching projection 22. A flexible and elastic tab 23 protrudes downward from the front lid rim 13.4. The tab 23 comprises two lateral tab strips 23.1, 23.2, between which a recess 24 is provided (see FIG. 1*d*). The tab strips 23.1, 23.2 are each located at a corner between the front lid rim 13.4 and the two lateral lid rims 13.2, 13.3. The two tab strips 23.1, 23.2 are connected at the bottom with a strip-shaped first lever 25, which extends outwards parallel to the lid base 13. The outer edge of the first lever 25 is circular. The first lever 25 limits the recess 24 below. The inner, upper edge of the first lever 25 is a latching edge 26 (see FIGS. 2*d*, 3*d*). The first lever 25 comprises a second bevel 27 (FIG. 3*d*) at its inner edge on the lower side. From the outer edge of the first lever 25, a hollow cylindrical second lever 28 projects upwards.

The hinge bands 16.1, 16.2 and tab strips 23.1, 23.2 are flexible. The first and second levers 25, 28, however, are rigid. The plug 14 and/or the sealing area 8 are flexible and/or rigid. The remaining lidded vessel 2 is preferably rigid. The rigid and flexible properties are achieved by the shape and/or the wall thickness and/or materials of the respective parts. The third latching projection 22 and the latching edge 26 form a second latching device 29 (see FIG. 3*d*).

The lidded vessel 1.1 is produced by injection molding in the open arrangement shown in FIG. 1. The first latching projection 19 and the bead 14.2 form undercuts which, due to their small dimensions, permit production by means of a simple injection mold comprising only two mold halves which can be moved apart along an axis for demolding.

After production, the lid 12 is closed and brought into the latching position, in which the bead 14.2 engages the first latching projection 19. The first latching device 21 formed by the first latching projection and bead 14.2 holds the lid 12 in the parking position on the vessel 2. This is shown in FIGS. 2*a-e*. In this condition, a large number of lidded vessels 1.1 can be packed in one bag. The bead 14.2 contacts the first latching projection 19 with negligible force. The sealing area 8 is not under tension. As a result, sealing area 8 and bead 14.2 do not relax in the parking position, even if this is maintained for longer periods (e.g. months or years).

For use, the user removes individual lidded vessels 1.1. If necessary, he may provide the lid base 13 with a label on the outside to identify the respective lidded vessel 1.1. This can be done in the parking position. As the cross-section of the vessel 2 in the parking area 7 is reduced towards the bottom, the lid 12 is not pressed deeper into the vessel even when labelled. After labelling, the user can open the lid 12, preferably to the position shown in FIGS. 1*a-e* or to a less open intermediate position. Afterwards, the vessel 2 can be filled with sample liquid.

Finally, the filled vessel 2 is closed by closing the lid 12. To do this, the user can press against the outside of the lid base 13 so that the lid swivels around hinge 16. The lid 12 enters the vessel opening 6 with the plug, which is facilitated by the widened parking area 7. Afterwards the bead 14.2 enters the sealing area 8 and seals on top. When the lid is closed, the first lever 25 with the second bevel 27 meets the first bevel 10.2 of the third latching projection 22. When the lid 12 is pressed further, the tab strips 23.1, 23.2 are deflected laterally outwards (see FIGS. 2*d*, 3*d*).

When the latching edge 26 has reached the lower outer edge of the third latching projection 22, the elastic tab strips 23.1, 23.2 spring towards the vessel 2 and the latching edge 26 at the first lever 25 engages under the third latching projection 22. Thereby, the latching is completed and the lid 12 is secured to the vessel 2. This is shown in FIGS. 3*a-e*. Since sealing area 8 and bead 14.2 are not relaxed, the bead 14.2 rests on sealing area 8 under a bias that is sufficiently high to seal the vessel 2 liquid-tight and, if necessary, gas-tight.

To open the lid 12, the user presses against the outside of the second lever 28. The force is applied horizontally and with one component upwards. This swivels the second lever 28 towards the lid base 13 and the first lever 25 is released from the third latching projection 22 with the latching edge 26. Further pressing against the second lever 28 causes the first lever 25 to slide up with its upper side on the lower outer edge of the third latching projection 22 until the latching edge 26 slides over the lower outer edge of the third latching projection 22 and comes free. By pressing the second lever 28 further, the lid 12 is swiveled into the open position (see FIGS. 1*a-e*).

Figure 4:
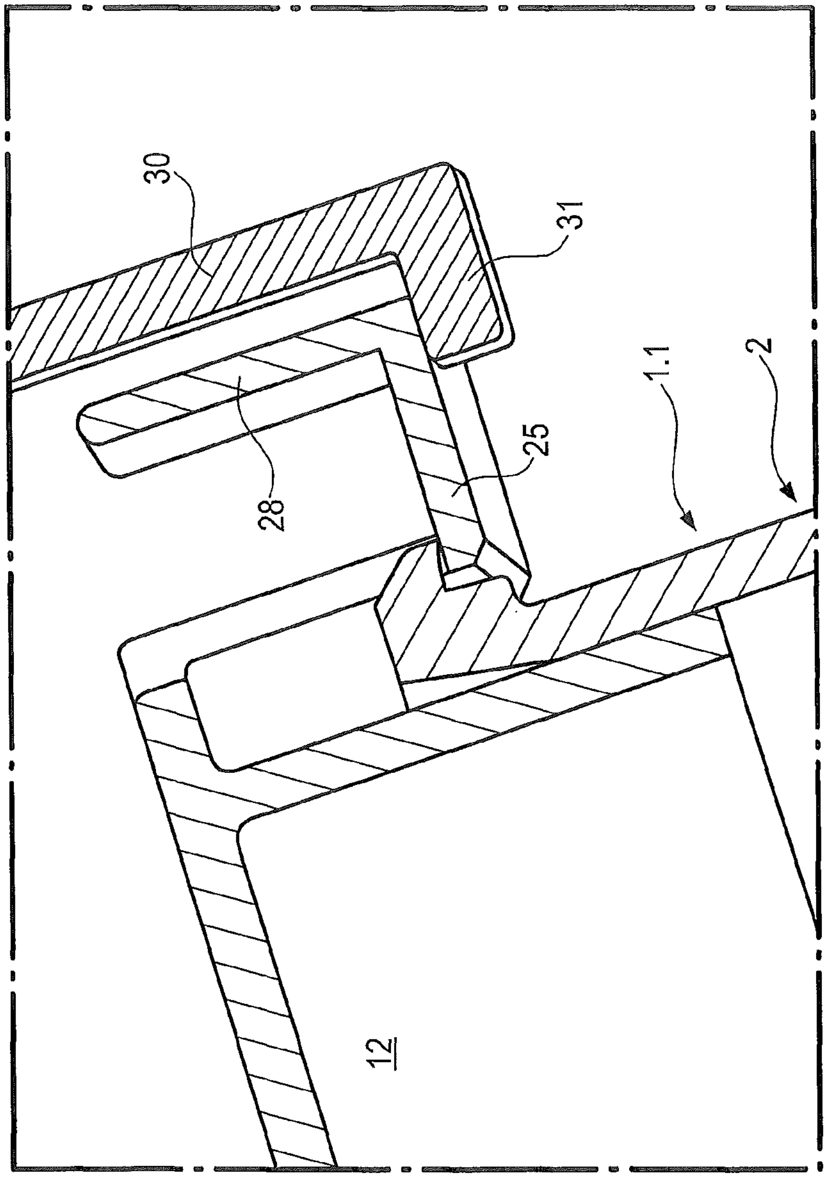
FIG. 4 illustrates an enlarged side perspective view of an embodiment of the lidded vessel when opened with an automaton tool.

According to FIG. 4, lid 12 can be opened alternatively by means of a hook-shaped tool 30 of an automatic laboratory machine. The tool 30 is attached with an angled leg 31 at its lower end under the first lever 25. By lifting the tool 30, the first lever 25 is swiveled up so that the latching edge 26 is released from the third latching projection 22. Then the lid 12 is folded up using tool 30.

Figure 5:
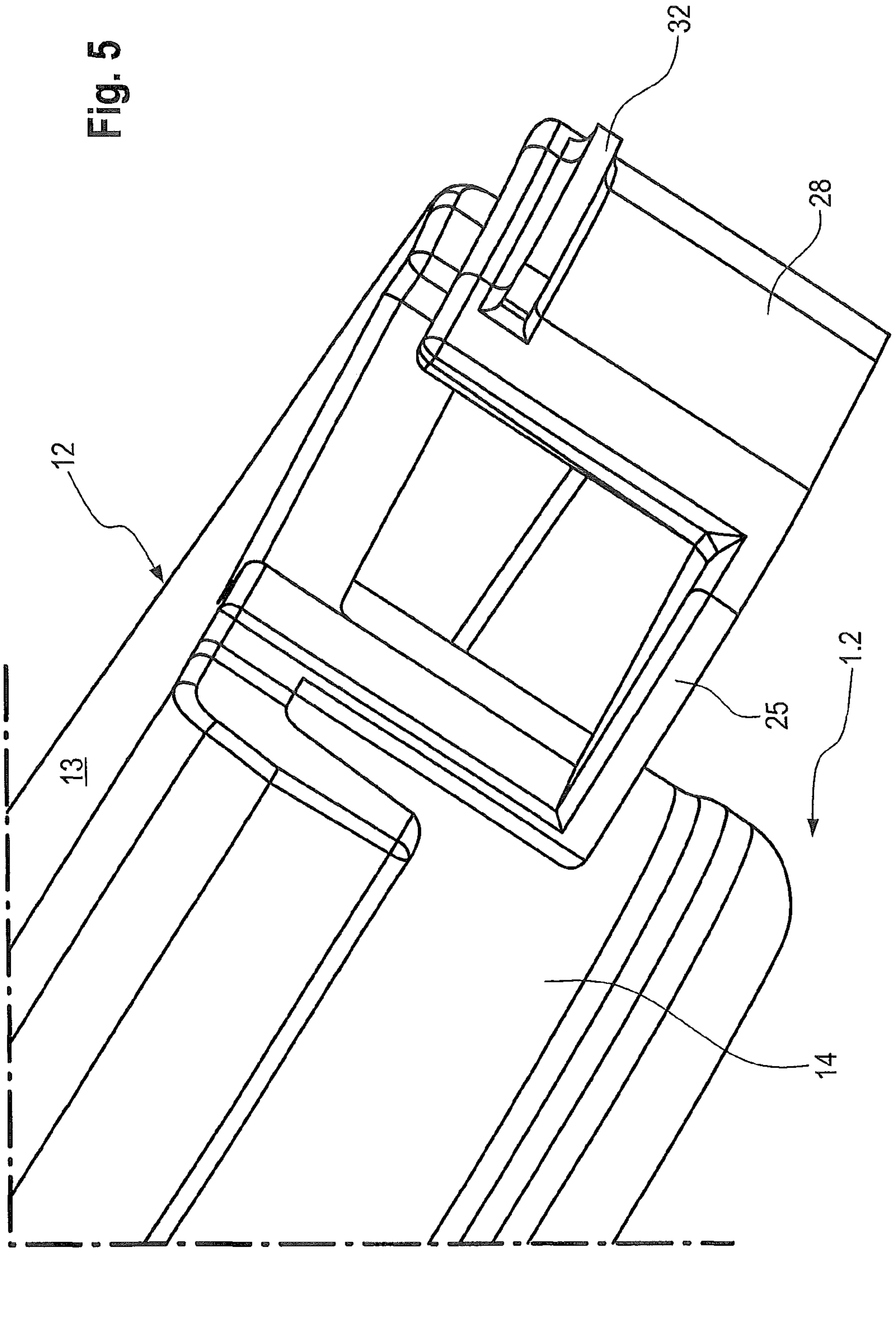
FIG. 5 illustrates an enlarged side perspective view of an embodiment of a lidded vessel with laterally protruding rib for opening by means of a working cone of a dosing device.

The lidded vessel 1.2 of FIG. 5 differs from the one described above in that at the upper end of the second lever 28 a rib 32 extending in horizontal direction protrudes outwards.

Figure 6:
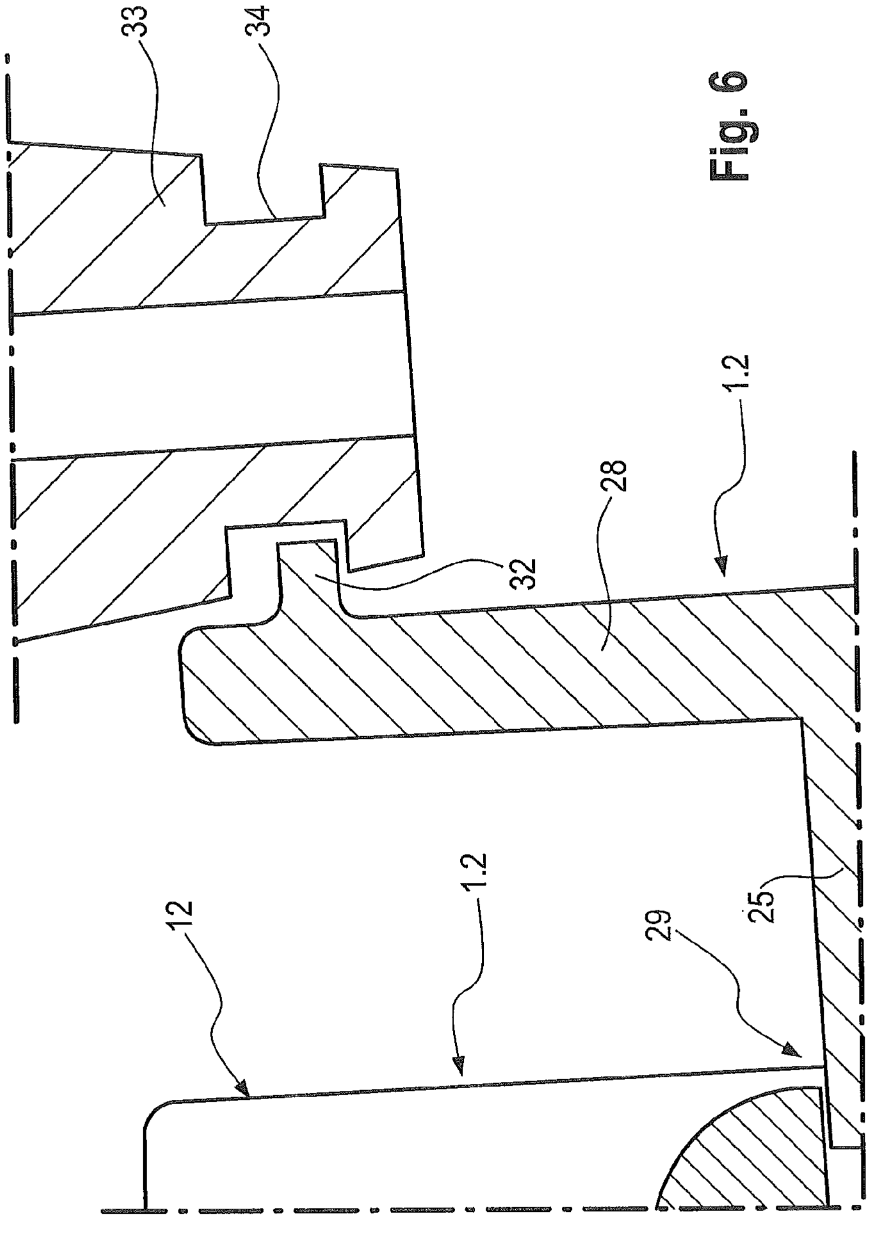
FIG. 6 illustrates a cross sectional view of an embodiment of the lidded vessel when opened using a working cone.
Figure 7:
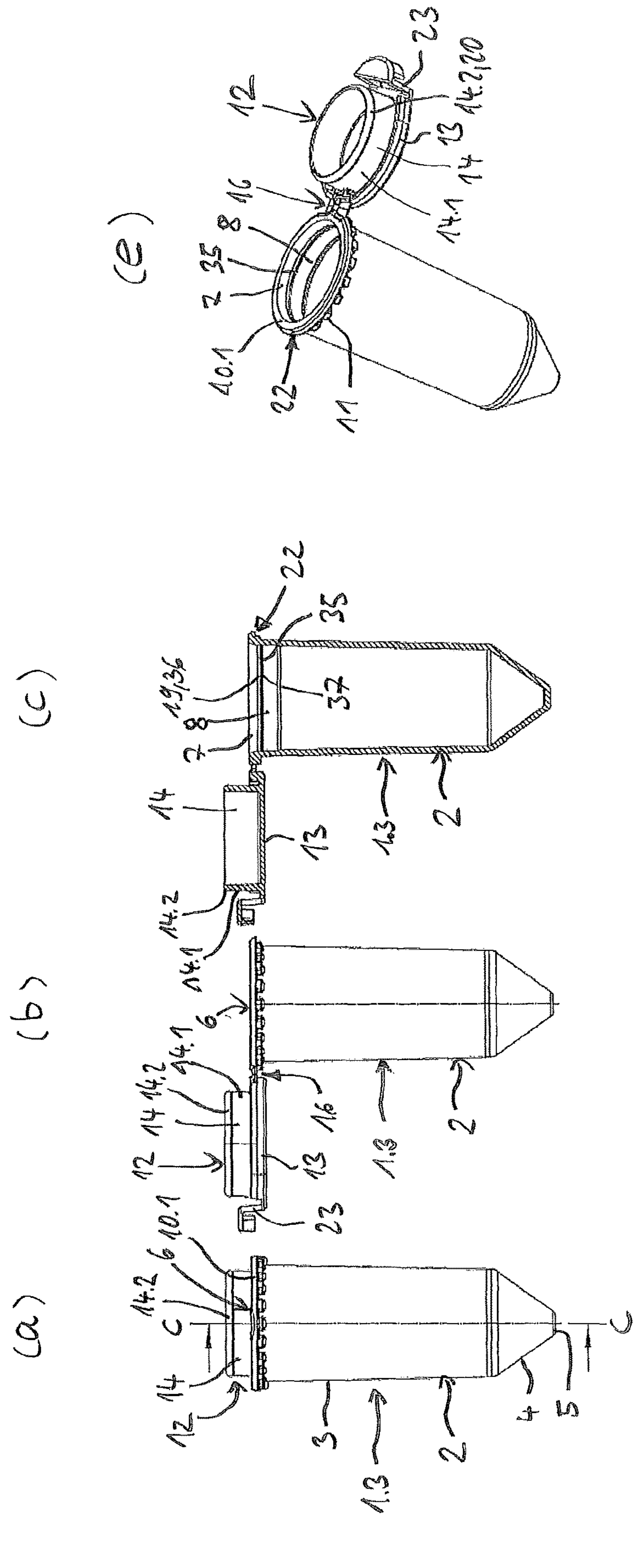
FIG. 7*a* illustrates a front view of an embodiment of the lidded vessel with hinge and completely encircling groove with a lid in the open position.
FIG. 7*b* illustrates a side view of the embodiment of the lidded vessel of FIG. 7*a;*
FIG. 7*c* illustrates a cross sectional view of the embodiment of the lidded vessel of FIG. 7*a* along line c-c.
FIG. 7*d* illustrates a top plan view of the embodiment of the lidded vessel of FIG. 7*a;*
FIG. 7*e* illustrates a side perspective view of the embodiment of the lidded vessel of FIG. 7*a;*
Figure 7D:
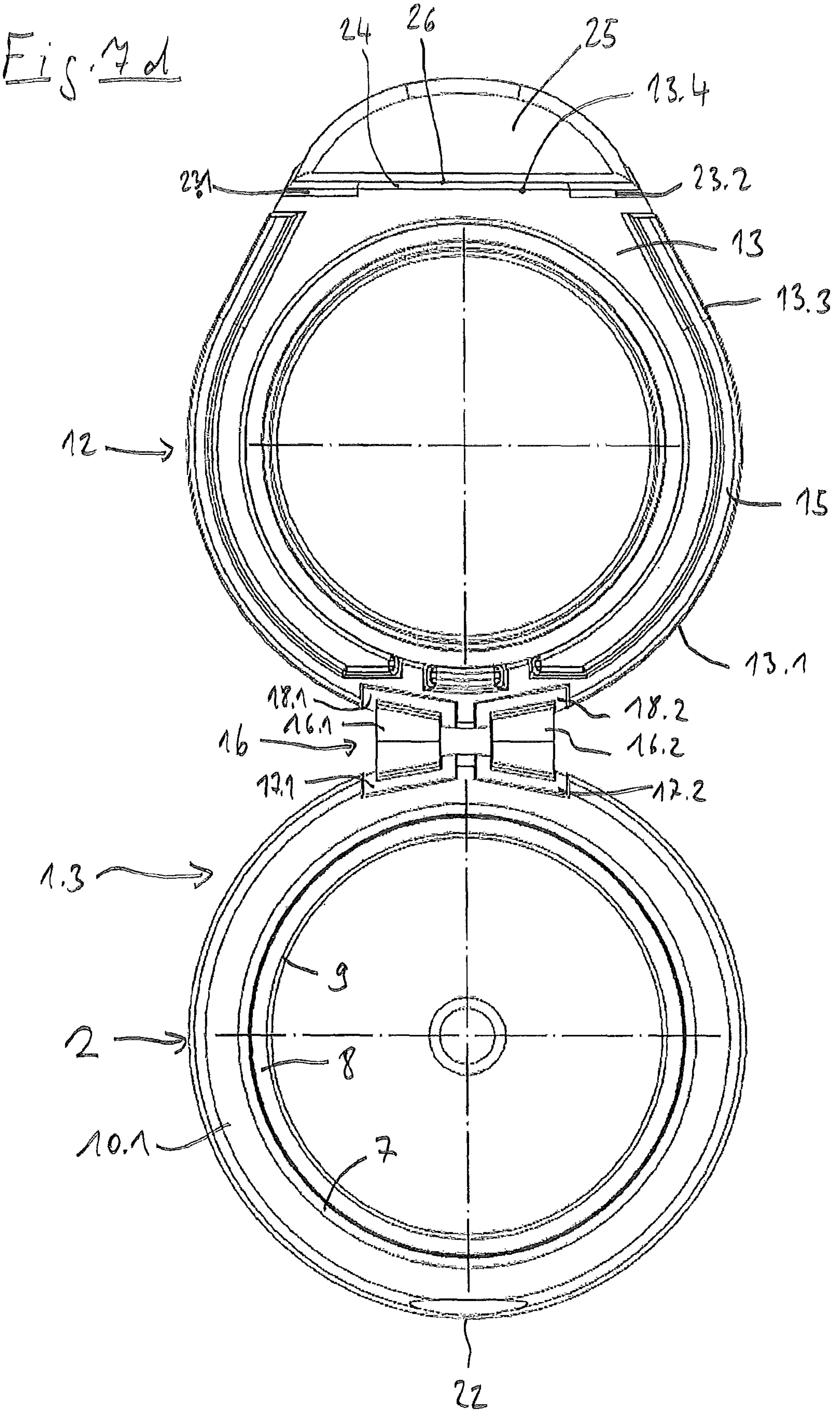

As shown in FIG. 6, the second lever 28 can be swiveled towards the vessel 2 by pressing against a working cone 33, which in itself serves to clamp a pipette tip, in order to release the locking of the second latching device 29. The rib 32 engages in a circumferential annular groove 34 of the working cone 33. When the second latching device 29 is released, the lid 12 can be opened by lifting the working cone 33.

Figure 8:
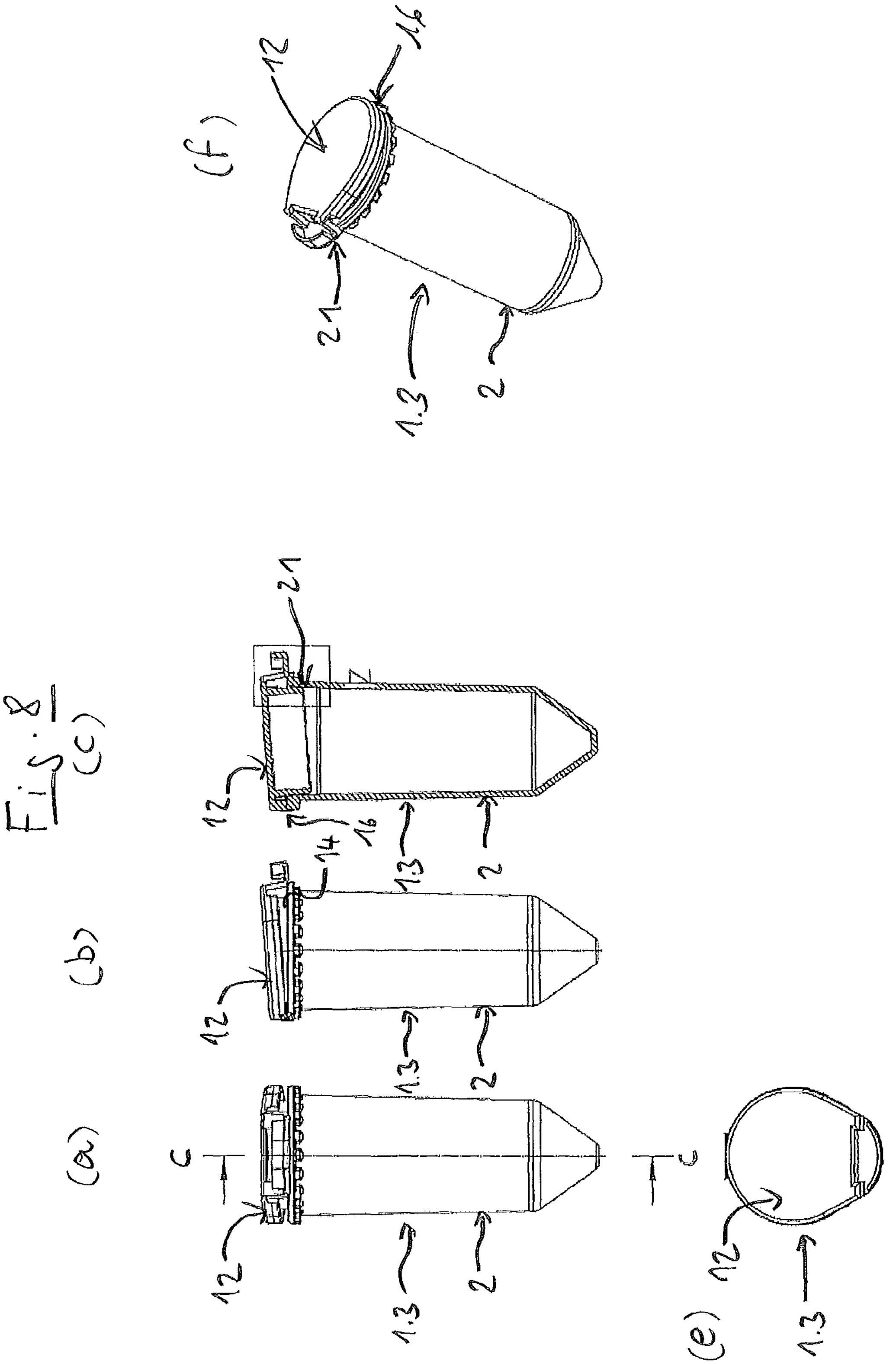
FIG. 8*a* illustrates a front view of the embodiment of the lidded vessel of FIG. 7*a* with a lid in a parking position.
FIG. 8*b* illustrates a side view of the embodiment of the lidded vessel of FIG. 8*a;*
FIG. 8*c* illustrates a cross sectional view of the embodiment of the lidded vessel of FIG. 8*a* along line c-c.
FIG. 8*d* illustrates an enlarged view of FIG. 8*c;*
FIG. 8*e* illustrates a top plan view of the embodiment of the lidded vessel of FIG. 8*a;*
FIG. 8*f* illustrates a side perspective view of the embodiment of the lidded vessel of FIG. 8*a;*
Figure 8D:
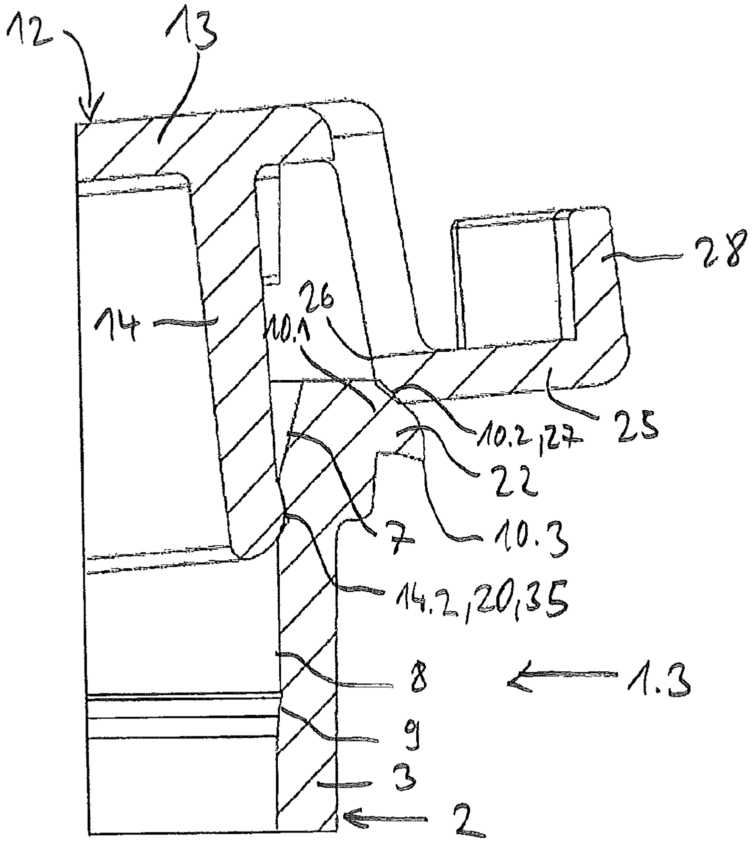
Figure 9:
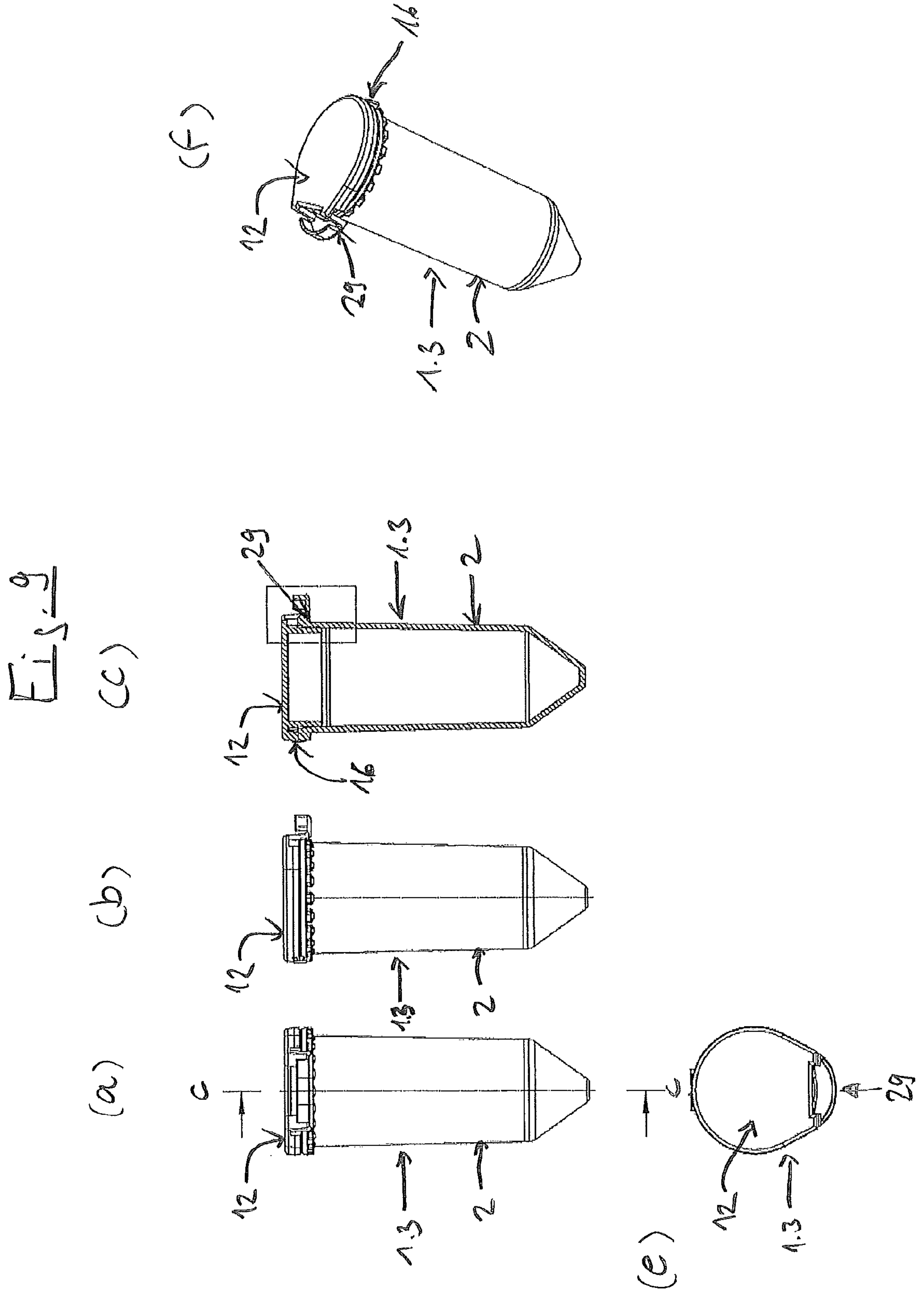
FIG. 9*a* illustrates a front view of the embodiment of the lidded vessel of FIG. 8*a* with the lid in sealing position.
FIG. 9*b* illustrates a side view of the embodiment of the lidded vessel of FIG. 9*a;*
FIG. 9*c* illustrates cross sectional view of the embodiment of the lidded vessel of FIG. 9*a* along line c-c.
FIG. 9*d* is an enlarged view of FIG. 9*c;*
FIG. 9*e* illustrates a top plan view of the embodiment of the lidded vessel of FIG. 9*a;*
FIG. 9*f* illustrates a side perspective view of the embodiment of the lidded vessel of FIG. 9*a*.
Figure 9D:
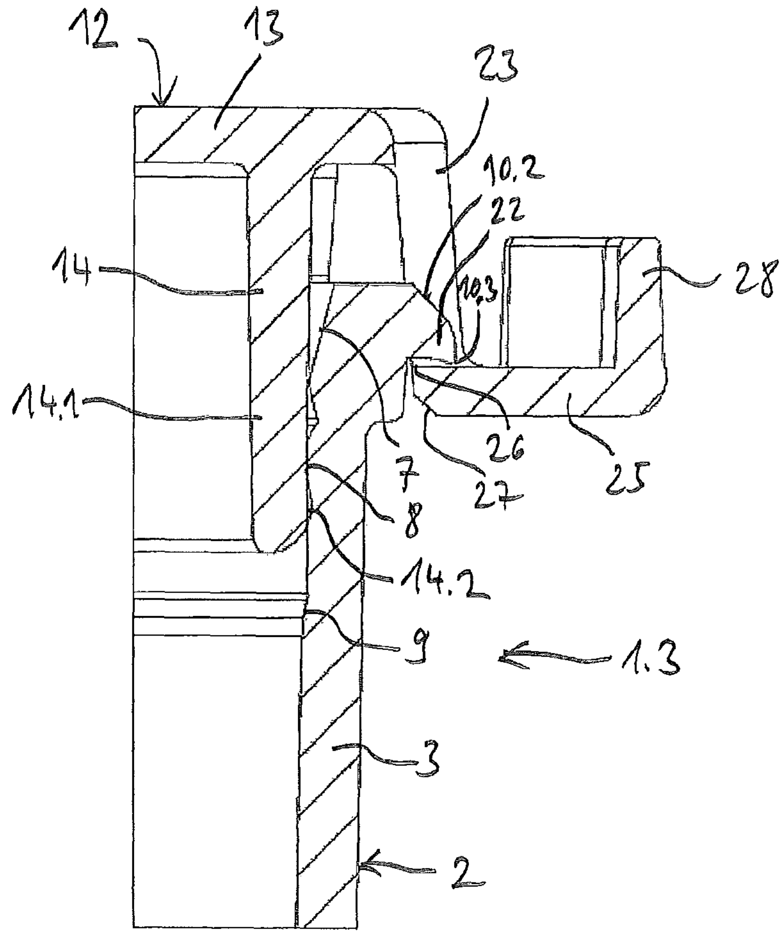

FIGS. 7*a* to 9*f* show another embodiment of the lidded vessel 1.3 with a hinge 16 and a groove 35 running completely around the inner wall of the vessel at the lower end of parking area 7. In contrast to lidded vessel 1.1, lidded vessel 1.3 does not have a first latching projection 19 at the top of parking area 7. Apart from that, the lidded vessel 1.3 is identical to lidded vessel 1.1. The upper flank 36 of the groove 35 forms the first latching projection 19, which is undercut by the bead 14.2 in the parking position as shown in FIG. 8*d*. The lower flank 37 of the groove 35 engages under the bead 14.2 and prevents the plug 14 from being pressed deeper into the vessel 2 in the parking position. As shown in FIGS. 9*d*, the bead 14.2 rests sealingly on the sealing area 8 in the sealing position.

Figure 10:
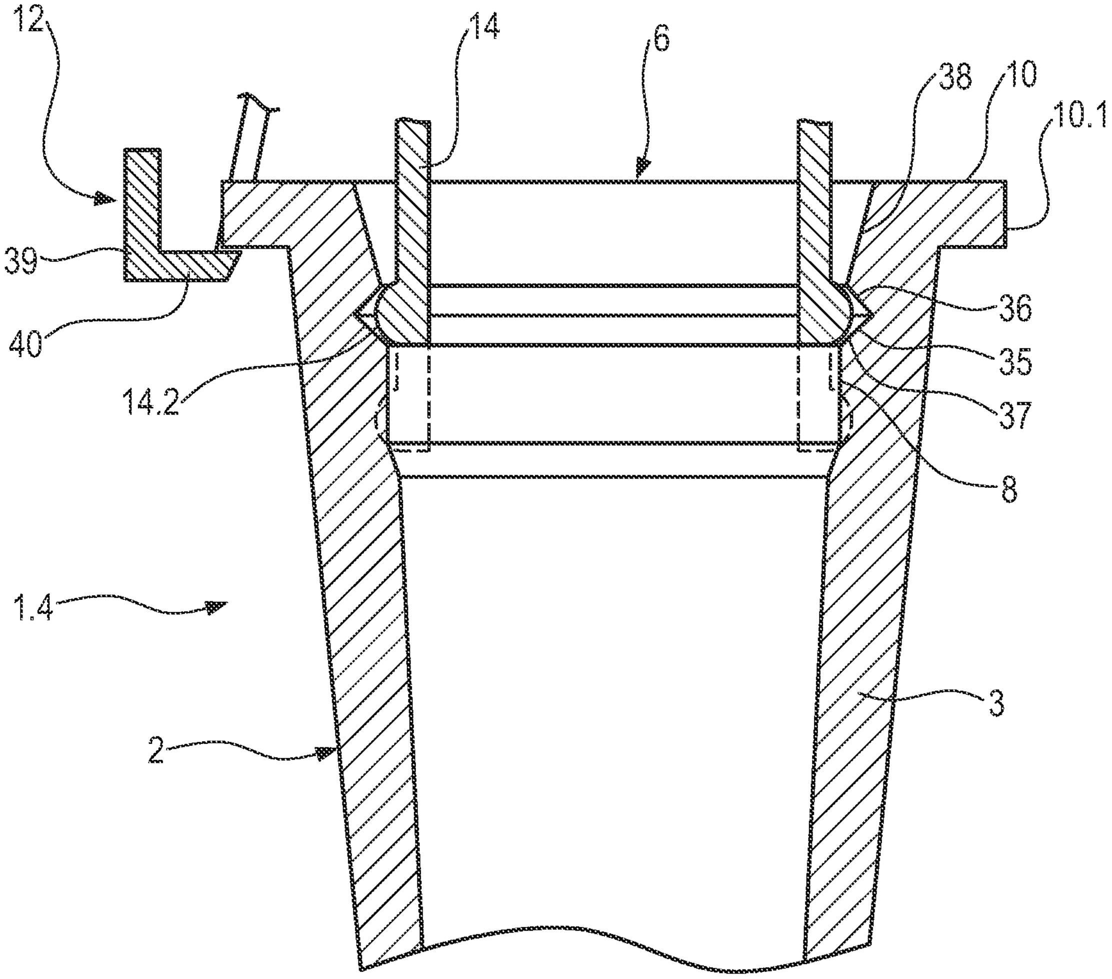
FIG. 10*a* illustrates a cross sectional view of an embodiment of a lidded vessel with the lid and vessel joined together in the axial direction of the vessel.

FIG. 10 shows another embodiment of the lidded vessel 1.4, where lid 12 and vessel 2 are not connected by a hinge 16. The vessel 2 has a conical insertion area 38 at the inner side of the vessel opening 6. Directly below the conical insertion area 38, the inner circumference of the vessel comprises a circumferential groove 35 that defines a parking area. In the example, the groove 35 has a triangular cross-section with an upper flank 36 and a lower flank 37. Beneath this is a cylindrical sealing area 8, followed by an essentially hollow cylindrical section 3 of vessel 2. At the top, vessel 2 has a circumferential flange 10, the section of which protrudes radially outwards from a hollow cylindrical section 3 of the vessel and forms a latching projection 10.1. The lid 12 comprises a lid base and a plug 14 which protrudes downwards. The plug has a bead 14.2. on the outside of the lower edge. Furthermore, several latching hooks 39 are connected to the outer edge of the lid base 13, which comprise inwardly pointing hook ends 40 at the bottom with which they can be latched to the underside of the flange 10.

FIG. 10 shows a portion of the plug 14 in a single piece in extended lines in the parking position. In this position the bead 14.2 engages in the groove 35. This prevents unintentional escape of plug 14 from the vessel 2 or deep-entry of the plug 14 into the vessel 2. Since the bead 14.2 is seated with clearance in the groove 35, the bead 14.2 does not relax. Since the sealing area 8 is not loaded, it does not relax either. A lower part of plug 14 is shown in dotted lines in the sealing position. Since the inner diameter of the vessel 2 in sealing area 8 is smaller than the outer diameter of the bead 14.2, the bead 14.2 is in contact with sealing area 8 in the sealing position.

A latching hook 39 of lid 12 is shown in extended lines in the sealing position. The latching hook 39 engages under the flange 10, which is also the case for the other latching hooks 39 not shown. This holds the lid 12 in the sealing position. The vessel 2 can be opened by bending the latching hooks 39 outwards. In the parking position, the lid 12 can be held in place on the vessel 2 simply by engaging the bead 14.2 in the flank 36 of the vessel 2.

LIST OF REFERENCE SYMBOLS

1.1 lidded vessel
1.2 lidded vessel
1.3 lidded vessel
1.4 lidded vessel
2 vessel, receptacle, container
3 hollow cylindrical section
4 conical section
5 vessel base
6 vessel opening
7 parking area
8 sealing area
9 transition area
10.1 flange
10.2 first bevel
10.3 edge
11 projection
12 lid
13 lid base
13.1 circular lid rim
13.2, 13.3 lateral lid rims
13.4 front lid rim
14 plug
14.1 cylindrical plug section
14.2 bead
15 lid projection
16 hinge
16.1, 16.2 hinge bands
17.1, 17.2 first pockets
18.1, 18.2 second pocket
19 latching projection
20 second latching projection
21 first latching device
22 third latching projection
23 tab
23.1, 23.2 tab strips
24 recess
25 first lever
26 latching edge
27 second bevel
28 second lever
29 second latching device
30 tool
31 leg
32 rib
33 working cone
34 annular groove
35 groove
36 (upper) flank
37 (lower) flank
38 insertion area
39 latching hook
40 hook ends

The invention claimed is:

1. A lidded vessel assembly comprised of plastic and configured for laboratory use, the lidded vessel assembly comprising:
- a tubular vessel having a top end and a bottom end, the tubular vessel comprising,
  - a vessel base at the bottom end,
  - a vessel opening defined at the top end,
  - an inner wall, and
  - a sealing area and a parking area both defined on the inner wall and both below the vessel opening;
- a lid comprising,
  - a lid base having an outside surface and an inside surface, and
  - a plug projecting from the inside surface of the lid base and configured to be inserted through the vessel opening to engage the parking area to define a parking position, and configured to be further inserted through the vessel opening out of the parking area to bias against a portion of the sealing area to define a sealing position; and
- a first latching device comprising,
  - a first latching element positioned on the inner wall of the vessel, and a second latching element positioned on an outside of the plug provided for releasably latching the lid to the vessel in the parking position,
- wherein the first latching element comprises a radially inwardly projecting first latching projection positioned on the inner wall of the vessel and pointing radially inwardly into the inner wall of the vessel.

2. The lidded vessel assembly according to claim 1, wherein the lid covers the vessel opening when the plug is in the parking position.

3. The lidded vessel assembly according to claim 2, wherein there is a clearance fit between the plug and the parking area when the plug is in the parking position, wherein the smallest radial direction of the parking area is larger than or equal to largest radial dimension of the plug.

4. The lidded vessel assembly according to claim 1, wherein the parking area is positioned above the sealing area and comprises a conical shape with a greater diameter towards the top end of the tubular vessel.

5. The lidded vessel assembly according to claim 1, wherein the second latching element comprises a radially outward projection relative to the plug and positioned on a lower end of an outside of the plug.

6. The lidded vessel assembly according to claim 5, wherein the first latching device comprises a groove which at least partially circumscribes the inner wall of the vessel, and wherein the radially outward projection of the plug engages the groove in the parking position.

7. The lidded vessel assembly according to claim 6, wherein the radially outward projection comprises a bead at least partially circumscribing the outside of the plug and configured to engage with the groove in the parking position.

8. The lidded vessel assembly according to claim 7, wherein the bead abuts against the sealing area in the sealing position to create a liquid-tight seal between the bead and the sealing area.

9. The lidded vessel assembly according to claim 1, further comprising a second latching device configured to releasably latch the lid to the vessel in the sealing position.

10. The lidded vessel assembly according to claim 9, wherein the second latching device comprises at least a third latching projection projecting radially outwards proximate the top end of the vessel, at least one elastic tab projecting from the inside surface of the lid base and a latching edge positioned at a distance from the lid base.

11. The lidded vessel assembly according to claim 10, wherein the latching edge is configured to be snapped under the third latching projection when the plug is inserted into the sealing area.

12. The lidded vessel assembly according to claim 9, wherein the lid and the tubular vessel are hingedly coupled to one another at a pivot point.

13. The lidded vessel assembly according to claim 12, wherein at least one of the first latching device and the second latching device is positioned diametrically opposite the pivot point.

14. The lidded vessel assembly according to claim 1, wherein the tubular vessel comprises a volume of at least 0.5 ml.

15. The lidded vessel assembly according to claim 1, wherein the tubular vessel and the lid are produced as a single component by an injection molding process.

16. The lidded vessel assembly according to claim 15, wherein the tubular vessel and the lid are comprised of one of polyolefin and a cyclic olefinic (CO) polymer.

17. A lidded vessel assembly comprised of plastic and configured for laboratory use, the lidded vessel assembly comprising:

a tubular vessel having a top end and a bottom end, the tubular vessel comprising,
 a vessel base at the bottom end,
 a vessel opening defined at the top end,
 an inner wall, and
 a sealing area and a parking area both defined on the inner wall and both below the vessel opening;
a lid comprising,
 a lid base having an outside surface and an inside surface, and
 a plug projecting from the inside surface of the lid base and configured to be inserted through the vessel opening to engage the parking area to define a parking position, and configured to be further inserted through the vessel opening out of the parking area to bias against a portion of the sealing area to define a sealing position; and
a first latching device comprising,
 a first latching element positioned on the inner wall of the vessel, and a second latching element positioned on an outside of the plug provided for releasably latching the lid to the vessel in the parking position;
a second latching device configured to releasably latch the lid to the vessel in the sealing position, the second latching device comprises,
 at least a third latching projection projecting radially outwards proximate the top end of the vessel, at least one elastic tab projecting from the inside surface of the lid base and a latching edge positioned at a distance from the lid base wherein the latching edge is configured to be snapped under the third latching projection when the plug is inserted into the sealing area; and
a first lever projecting laterally outwards from the tab at a distance from the lid base, and a second lever projects upwards from the first lever at a distance from the at least one elastic tab.

18. The lidded vessel assembly according to claim 17, wherein the parking area is positioned above the sealing area and comprises a conical shape with a greater diameter towards the top end of the tubular vessel.

19. A lidded vessel assembly A lidded vessel assembly comprised of plastic and configured for laboratory use, the lidded vessel assembly comprising:

a tubular vessel having a top end and a bottom end, the tubular vessel comprising,
 a vessel base at the bottom end,
 a vessel opening defined at the top end,
 an inner wall, and
 a sealing area and a parking area both defined on the inner wall and both below the vessel opening;
a lid comprising,
 a lid base having an outside surface and an inside surface, and
 a plug projecting from the inside surface of the lid base and configured to be inserted through the vessel opening to engage the parking area to define a parking position, and configured to be further inserted through the vessel opening out of the parking area to bias against a portion of the sealing area to define a sealing position; and
a first latching device comprising,
 a first latching element positioned on the inner wall of the vessel, and a second latching element positioned on an outside of the plug provided for releasably latching the lid to the vessel in the parking position;
a second latching device configured to releasably latch the lid to the vessel in the sealing position, the second latching device comprises,
 at least a third latching projection projecting radially outwards proximate the top end of the vessel, at least one elastic tab projecting from the inside surface of the lid base and a latching edge positioned at a distance from the lid base wherein the latching edge is configured to be snapped under the third latching projection when the plug is inserted into the sealing area;
a first lever projecting laterally outwards from the tab at a distance from the lid base, and a second lever projects upwards from the first lever at a distance from the at least one elastic tab; and
a rib protruding outwardly from an outer side of the second lever.

20. The lidded vessel assembly according to claim 19, wherein the lid and the tubular vessel are hingedly coupled to one another at a pivot point, and wherein at least one of the first latching device and the second latching device is positioned diametrically opposite the pivot point.

* * * * *